United States Patent
Arkas et al.

(10) Patent No.: US 8,127,545 B2
(45) Date of Patent: *Mar. 6, 2012

(54) SOLAR ENERGY TRAP AND TURBINE

(76) Inventors: Evangelos Arkas, London (GB);
Nicholas Arkas, London (GB)

( * ) Notice: Subject to any disclaimer, the term of this patent is extended or adjusted under 35 U.S.C. 154(b) by 103 days.

This patent is subject to a terminal disclaimer.

(21) Appl. No.: 11/791,434

(22) PCT Filed: Nov. 22, 2005

(86) PCT No.: PCT/GB2005/004477
§ 371 (c)(1),
(2), (4) Date: Jan. 22, 2008

(87) PCT Pub. No.: WO2006/056757
PCT Pub. Date: Jun. 1, 2006

(65) Prior Publication Data
US 2008/0256953 A1    Oct. 23, 2008

(30) Foreign Application Priority Data
Nov. 23, 2004 (GB) .................................. 0425777.0

(51) Int. Cl.
*F03G 6/00* (2006.01)
(52) U.S. Cl. .................... 60/641.15; 60/641.8
(58) Field of Classification Search ............ 60/641.8, 60/641.15; 136/248
See application file for complete search history.

(56) References Cited

U.S. PATENT DOCUMENTS

| | | | | |
|---|---|---|---|---|
| 3,923,381 A * | 12/1975 | Winston | | 359/852 |
| 3,958,553 A | 5/1976 | Brantley et al. | | |
| 4,088,116 A * | 5/1978 | Pastor | | 126/677 |
| 4,147,415 A | 4/1979 | Dolan et al. | | |
| 4,280,482 A | 7/1981 | Nilsson, Sr. et al. | | |
| 4,397,152 A | 8/1983 | Smith et al. | | |
| 4,680,090 A * | 7/1987 | Lew | | 202/187 |
| 6,666,207 B1 | 12/2003 | Arkas et al. | | |
| 2006/0231132 A1* | 10/2006 | Neussner | | 136/244 |
| 2008/0066800 A1* | 3/2008 | Arkas et al. | | 136/248 |

FOREIGN PATENT DOCUMENTS
DE  10254254 A1  6/2004
* cited by examiner

Primary Examiner — Hoang Nguyen
(74) Attorney, Agent, or Firm — Seyfarth Shaw LLP

(57) ABSTRACT

A solar energy turbine includes solar energy trap (1110) having a chamber with an inlet port (12), such that solar energy (13) entering the chamber through the inlet port is absorbed and reflected within the chamber means until substantially all the solar energy is absorbed by the chamber. Preferably, the inlet port is arranged to cause photons of the solar energy entering the chamber to circulate substantially in a single direction within the chamber until absorbed, such that on re-passing the inlet port substantially no photons emerge from the inlet port. The solar energy turbine includes a heat exchanger (1150, 1160, 1170) for extracting energy from the solar energy trap to drive a turbine (1120).

47 Claims, 8 Drawing Sheets

SOLAR ENERGY TRAP AND TURBINE

This application is a U.S. National Phase of International Patent Application Serial No. PCT/GB2005/004477, filed Nov. 22, 2005 which claims priority to British Patent Application No. 0425777.0 filed Nov. 23, 2004.

FIELD OF THE INVENTION

This invention relates to a solar energy trap and a method of trapping solar energy, and in particular to a solar energy turbine.

BACKGROUND OF THE INVENTION

Solar radiation has a spectral, or wavelength, distribution from short wavelength radiation such as gamma and X-rays, to long wavelength radiation such as long radio waves. Different regions of the solar spectrum can be described by the range of their wavelengths. The combined radiation in the wavelength region from 280 nm to 4,000 nm is called the broadband, or total, solar radiation. About 99 percent of solar radiation is contained in the wavelength region from 300 nm to 3,000 nm. The visible spectrum extends from ultraviolet, about 390 nm, to near-infrared, 780 nm, and makes up only about 10 percent of the total solar spectrum. A peak in the solar spectrum occurs at 560 nm. The colour temperature of the solar spectrum varies with latitude between 3000 K and 3500 K.

It is difficult to utilise the full spectrum in the conversion of solar energy. For example, with parabolic reflector solar collectors, much of the solar energy is reflected back into space. Moreover, photovoltaic devices, used to convert solar energy, have a peak sensitivity at approximately 830 nm and only 14-16% of the collected energy is converted. Focussing rays of the sun using a multiplicity of mirrors to heat a liquid also results in much of the energy being reflected back into space.

U.S. Pat. No. 4,147,415 discloses a spiral shaped energy trap arranged so that incoming wave energy is reflected internally to reduce energy escape from the trap. There is no disclosure how trapped energy may be utilised within the trap or extracted from the trap, and the spiral shape would appear to provide difficulties in achieving such utilisation or extraction. Moreover, the spiral nature of the trap would appear to allow reversal and re-emergence of entrant energy waves.

U.S. Pat. No. 6,666,207 discloses a solar energy converter in the form of a cylindrical chamber with an input aperture in a centre of one circular end face. Since the motion of entrant energy may be expected to be substantially randomised by reflections, rather than circulating, a proportion of energy may be expected to re-emerge from the aperture. The cylindrical form also imposes limitations of energy utilisation within the chamber and extraction of energy from the chamber.

It is an object of the present invention at least to ameliorate the aforesaid disadvantages in the prior art.

SUMMARY OF THE INVENTION

According to a first aspect of the invention, there is provided a solar energy turbine comprising: a solar energy trap chamber means defining an internal volume, the chamber means having inlet port means communicating with the internal volume, such that solar energy entering the chamber means through the inlet port means is absorbed and reflected within the chamber means until substantially all the solar energy is absorbed by the chamber means; and at least one heat exchanger means for extracting heat energy from the chamber means and at least one turbine means in fluid communication with the at least one heat exchanger means, such that energy of photons in the solar energy trap is absorbable by a fluid containable within the at least one heat exchanger means to drive the at least one turbine means.

Preferably, the inlet port means is arranged to cause photons of the solar energy entering the chamber means to circulate substantially in a single direction within the chamber means until absorbed, such that on re-passing the inlet port means substantially no photons emerge from the inlet port means.

Conveniently, photovoltaic cell means are located on internal walls of the chamber means for converting at least some of the solar energy to electricity.

Conveniently, thermovoltaic cell means are located on internal walls of the chamber means for converting at least some of the solar energy to electricity.

Advantageously, the solar energy turbine further includes temperature control means for maintaining a predetermined temperature differential across the photovoltaic cell means and/or thermovoltaic cell means for obtaining substantially maximum working efficiency thereof.

Conveniently, the heat exchanger means comprises jacket means located around at least a portion of the chamber means.

Advantageously, the chamber means is enclosed in pressurised vessel means for generation of high-grade steam.

Advantageously, the solar energy turbine further comprises electric generator means for using the high-grade steam for generating electricity.

Advantageously, the chamber means is of a re-circulating serpentine shape.

Conveniently, the chamber means comprises a plurality of elongate portions joined serially at alternate ends to neighbouring elongate portions by semicircular portions, a first of the plurality of elongate portions being joined to a serially last of the elongate portions by a U-shaped portion, to form a re-circulating chamber means.

Alternatively, the chamber means is a re-circulating coil.

Alternatively, the chamber means comprises an annulus.

Advantageously, the inlet port means comprises inlet tube means communicating with the internal volume.

Preferably, a longitudinal axis of the inlet tube means is inclined at an acute internal angle to a longitudinal axis of an elongate portion of the chamber means.

Conveniently, the chamber means has a circular transverse cross-section.

Alternatively, the chamber means has a polygonal transverse cross-section.

Advantageously, the chamber means has one of a square, an octagonal and a triangular cross-section.

Advantageously, the chamber means comprises hinged panel means to form a wall of the chamber means on which photovoltaic cells means and/or thermovoltaic cell means are located to form an inner surface of the chamber means.

Conveniently, the solar energy turbine is adapted for incineration of waste material.

Conveniently, the solar energy turbine is adapted for cremation of bodies.

Advantageously, the solar energy turbine comprises incineration vessel means located within the chamber means for containing material or a body to be incinerated.

Preferably, the incineration vessel means comprises at least one of temperature control means and pressure control means.

Conveniently, the chamber means is of one or more of metal, metal alloy and ceramic material.

Advantageously, the chamber means is of titanium-tungsten internally lined with high-temperature ceramic material.

Advantageously, the solar energy turbine comprises gas handling means for providing an inert gas environment within the chamber means.

Advantageously, the at least one heat exchanger means comprises at least one inner housing for containing the fluid and at least one outer housing spaced from the inner housing to allow passage therebetween of photons in the solar energy trap.

Conveniently, a first face of the at least one heat exchanger means within the solar energy trap is provided with convolution means or corrugation means to increase a surface area of the first face for enhancing absorption of energy from photons within the solar energy trap.

Conveniently, a second face of the heat exchanger in contact with the fluid is provided with convolution means or corrugation means for enhancing absorption of energy from the second face by the fluid.

Preferably, there is further provided at least one one-way valve substantially to prevent flow of the fluid away from at least one inlet port of the at least one turbine.

Advantageously, the solar energy turbine further comprises a compressor for injecting the fluid into the at least one heat exchanger means.

Conveniently, the solar energy turbine further comprises a re-circulating circuit for passing the fluid from at least one outlet port of the at least one turbine means to an inlet port of the compressor.

Advantageously, the re-circulating circuit includes re-circulating means for condensing evaporated fluid.

Preferably, the solar energy turbine comprises in fluid communication: compressor means, a first inner housing of a first heat exchanger means, a second inner housing of a second heat exchanger means, a third inner housing of a third heat exchanger means and at least one turbine means.

According to a second aspect of the invention, there is provided a method of converting solar energy comprising the steps of: providing chamber means defining an internal re-circulating volume; providing inlet port means communicating with the internal volume; admitting solar energy through the inlet port means into the internal volume such that the solar energy is absorbed and repeatedly reflected within the chamber means until substantially all the solar energy is absorbed by the chamber means; and providing at least one heat exchanger means in thermal communication with the chamber means and at least one turbine means in fluid communication with the at least one heat exchanger means, such that energy of photons in the solar energy trap is absorbed by a fluid contained within the at least one heat exchanger means to drive the at least one turbine means.

Preferably, the step of admitting solar energy through the inlet port means comprises causing photons of the solar energy entering the chamber means to circulate substantially in a single direction within the chamber means until absorbed, such that on re-passing the inlet port means substantially no photons emerge from the entry port.

Advantageously, the method comprises a further step of providing photovoltaic cell means located on internal walls of the chamber means and converting at least some of the solar energy to electricity therewith.

Advantageously, the method comprises a further step of providing thermovoltaic cell means located on internal walls of the chamber means and converting at least some of the solar energy to electricity therewith.

Preferably, the method includes further steps of providing temperature control means and thereby maintaining a predetermined temperature differential across the photovoltaic cell means and/or thermovoltaic cell means for substantially maximum working efficiency thereof.

Conveniently, the step of providing heat exchanger means comprises providing jacket means located around at least a portion of the chamber means.

Advantageously, the method comprises further steps of providing pressurised vessel means enclosing the chamber means and of generating high-grade steam therein.

Advantageously, the method comprises further steps of providing electric generator means and of using the high-grade steam for generating electricity thereby.

Advantageously, the method includes a further step of incinerating waste material with the trapped solar energy.

Advantageously, the method includes a further step of cremating bodies with the trapped solar energy.

Preferably, the method includes a further step of providing incineration vessel means within the chamber means for containing material or bodies to be incinerated.

Advantageously, the method comprises a further step of providing gas handling means and providing an inert gas environment within the chamber means therewith.

Conveniently, the step of providing at least one heat exchanger means comprises providing at least one inner housing for containing the fluid and at least one outer housing spaced from the inner housing and allowing passage therebetween of photons in the solar energy trap.

Advantageously, the method includes a further step of providing a first face of the heat exchanger within the solar energy trap with convolution means or corrugation means to increase a surface area thereof, for enhancing absorption of energy by the first face from photons within the solar energy trap.

Advantageously, the method includes a further step of providing a second face of the heat exchanger in contact with the fluid with convolution means or corrugation means for enhancing absorption of energy from the second face by the fluid.

Preferably, the method includes a further step of providing at least one one-way valve and substantially preventing flow therewith of the fluid away from at least one inlet port of the at least one turbine.

Preferably, the method comprises a further step of providing a compressor and injecting the fluid into the at least one heat exchanger therewith.

Advantageously, the method further comprises providing a re-circulating circuit and passing the fluid therethrough from at least one outlet port of the at least one turbine means to an inlet port of the compressor.

Conveniently, the method includes a further step of providing a re-circulating means in the re-circulating circuit and condensing evaporated fluid therewith.

Preferably, the method comprises providing, in fluid communication: compressor means, a first inner housing of a first heat exchanger means, a second inner housing of a second heat exchanger means, a third inner housing of a third heat exchanger means and at least one turbine means and passing the fluid from the compressor means through the first inner housing, the second inner housing and the third inner housing, the fluid absorbing energy therein from photons in the solar energy trap to increase the energy of the fluid, to the at least one turbine means and driving the at least one turbine means with the increased energy fluid.

BRIEF DESCRIPTION OF THE DRAWINGS

The invention will now be described, by way of example, with reference to the accompanying drawings in which.

In the Figures, like reference numbers denote like parts.

DETAILED DESCRIPTION OF EMBODIMENTS

Figure 1:
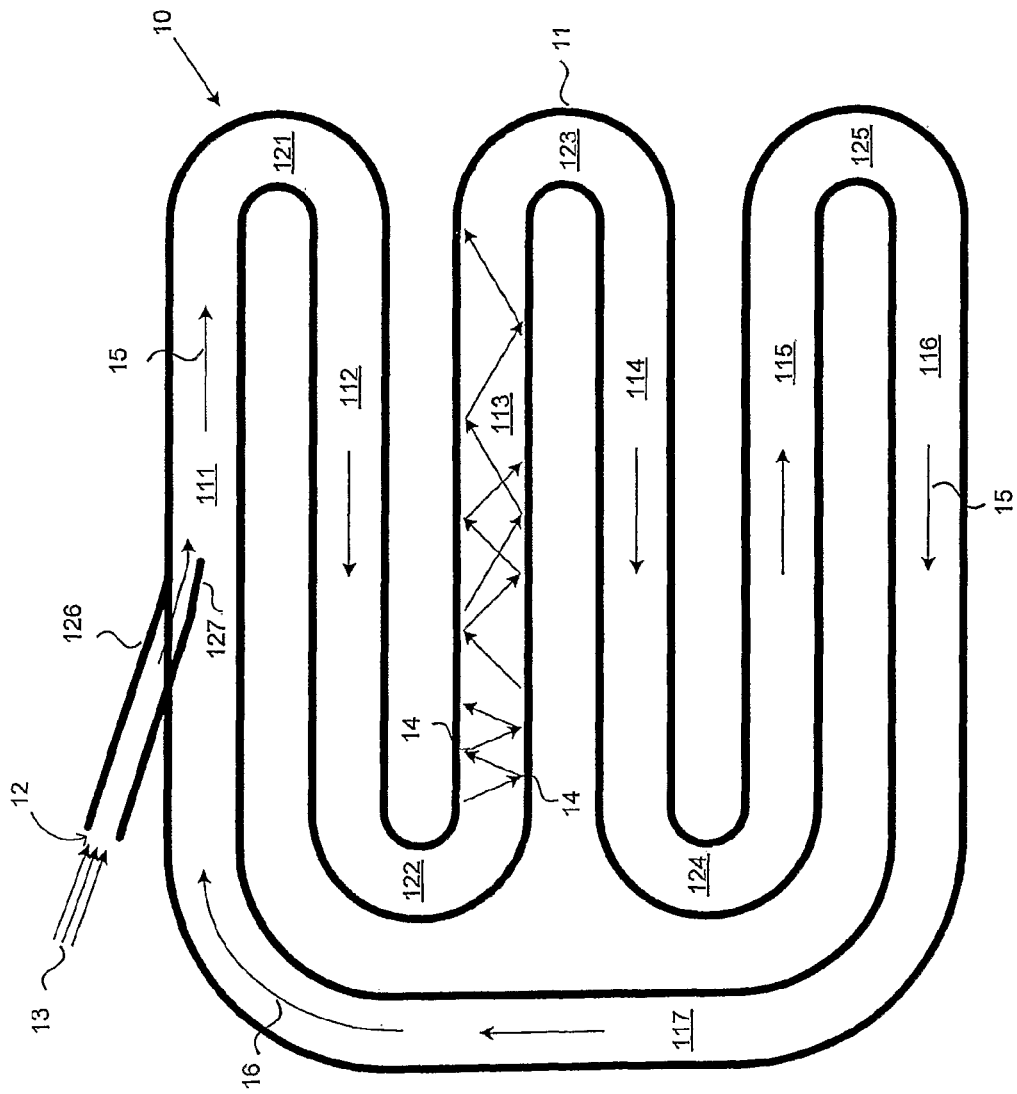
FIG. 1 is a schematic cross-sectional diagram of a solar energy trap according to the invention.

A first embodiment of a solar energy trap 10, illustrated in FIG. 1, for use in a solar turbine includes a closed serpentine chamber 11 with an inlet port 12. The closed serpentine chamber is formed of six parallel hollow elongate tubular portions, a first elongate portion 111 is joined to an adjacent second elongate portion 112 by a first semicircular tubular portion 121 at a first end of the second elongate portion 112 and the second elongate portion 112 is joined to a third elongate portion 113 at a second end of the second elongate portion opposed to the first end by a second semicircular portion 122. Similarly, the third elongate portion 113 is joined at a first end by a third semicircular portion 123 to a first end of a fourth elongate portion 114. Similarly, the fourth elongate portion 114 is joined at a second end opposed to the first end by a fourth semicircular portion 124 to a fifth elongate portion 115. Similarly, the fifth elongate portion 115 is joined at a first end by a fifth semicircular portion 125 to a first end of a sixth elongate portion 116. The sixth elongate portion 116 is joined at a second end opposed to the first end by a U-shaped portion 117 to a second end on the first elongate portion 111 to form the closed serpentine chamber 11.

The inlet port 12, which is formed by an inlet tube 126, of smaller cross-sectional diameter than portions of the serpentine chamber 11, and located approximately central of the first elongate portion 111, has a longitudinal axis at a first acute included angle to a longitudinal axis of the first elongate portion 111. A portion 127 of the inlet tube protruding into the first elongate portion 111 is inclined at a second acute included angle to a longitudinal axis of the first elongate portion 111 smaller than the first acute included angle.

Although the solar energy trap has been described as having a closed serpentine chamber 11, other forms of closed chamber with an inlet port may be used. For example, the closed chamber may be a coil with a first end of the coil joined to an opposed second end thereof. Alternatively, an annular doughnut closed chamber may be used.

Photovoltaic cells, with a peak sensitivity of substantially 830 nm, and/or thermovoltaic cells with a peak sensitivity of substantially 950 nm may be located on internal surfaces of the closed chamber. Cooling of the external surfaces of the closed chamber may be applied to maintain an optimal temperature differential across the photovoltaic cells and/or thermovoltaic cells corresponding to a peak yield of the cells. A suitable temperature to maintain one side of photovoltaic cells is at substantially 25° C., whereas thermovoltaic cells can operate between 50° C. and 400° C. Such cooling may be carried out by, for example, air flows or by water-based heat exchangers.

Figure 4:
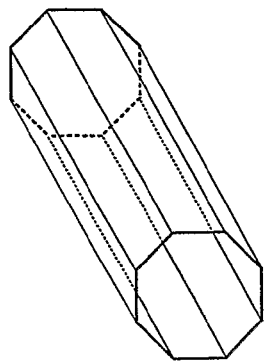
FIG. 4 is a perspective view of a tubular section of a variation of the solar energy trap of FIG. 1, having an octagonal transverse cross-section.
Figure 5:
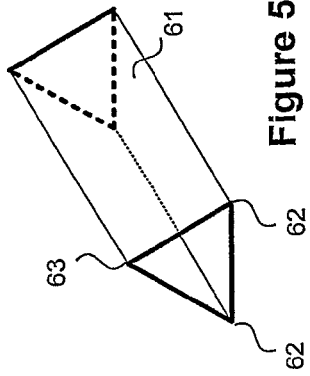
FIG. 5 is a perspective view of a tubular section of a variation of the solar energy trap of FIG. 1, having an equilateral triangular transverse cross-section.
Figure 3:
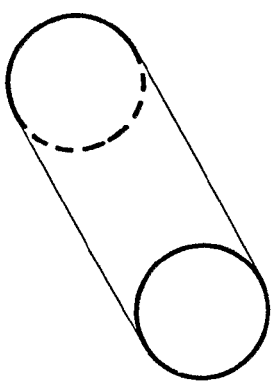
FIG. 3 is a perspective view of a tubular section of the solar energy trap of FIG. 1, having a circular transverse cross-section.
Figure 6:
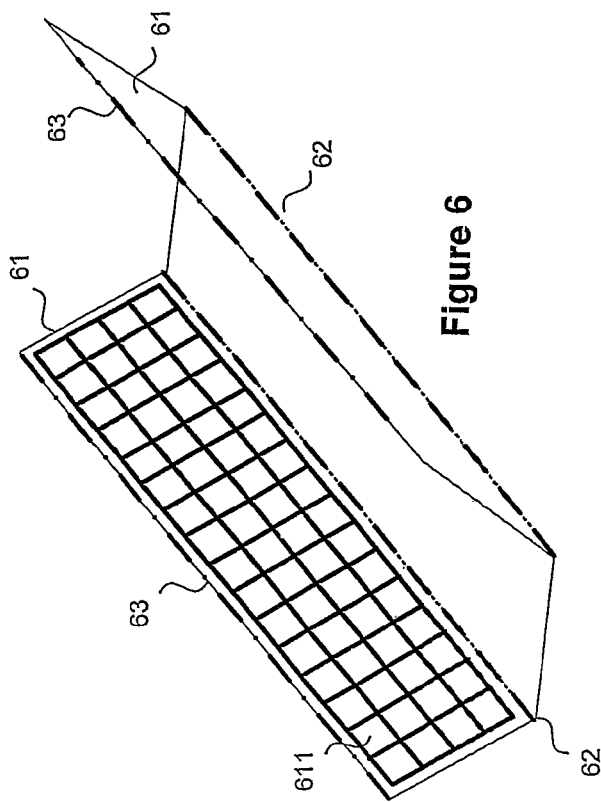
FIG. 6 is a perspective view of the tubular section of FIG. 5, in which panels forming two sides of the section are hinged to a third side and one panel is illustrated as being provided with photovoltaic or thermovoltaic devices.
Figure 2:
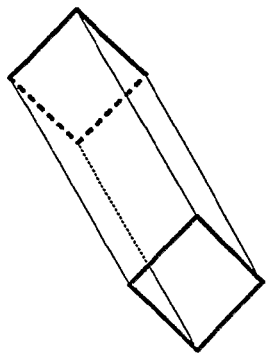
FIG. 2 is a perspective view of a tubular section of a variation of the solar energy trap of FIG. 1, having a square transverse cross-section.

The transverse cross-section of the sealed chamber may be, for example, a square as shown in FIG. 2, a circle as shown in FIG. 3, an octagon as shown in FIG. 4 or an equilateral triangle as shown in FIG. 5. Alternatively, any other transverse polygonal cross-section may be used. As illustrated for a triangular cross-section in FIG. 6, at least in the case of chambers made up from planar rectangular plates, adjacent planar plates 61 may be hinged along their long edges 62 to adjacent plates at all vertices except one, and be joinable at the remaining vertex 63, so that the chamber portion may be opened for, for example, inspection and maintenance. The flat panels also facilitate the use of planar photocells 611, whereas thin film cells may be used with circular or other cross-sections where the chamber does not include planar panels. Where the chamber has a polygonal cross-section, the connecting portions may be angular portions rather than arcuate portions as described above.

In use, substantially collimated solar energy 13, collected and directed by any method, enters the inlet port 12 and circulates around the closed chamber 11 by multiple reflections 14 from internal surfaces of the chamber. The inclination of the inlet port tube causes photons of the solar energy to circulate in a single direction, as shown by arrow-headed lines 15, around the serpentine chamber, such that on re-passing the inlet port substantially no unabsorbed photons issue from the chamber through the inlet port. That is, substantially all solar energy, of all wavelengths, once it has entered the inlet port remains in the closed chamber and is absorbed by the internal walls or cells located on the internal walls. That is, there is substantially a one-direction flow of photons, as shown by arcuate arrow-headed line 16, around the chamber. Photons reflected from the internal walls or cells may lose energy in each reflection or absorption, so that the energy of even high-energy photons is eventually absorbed.

Figure 7:
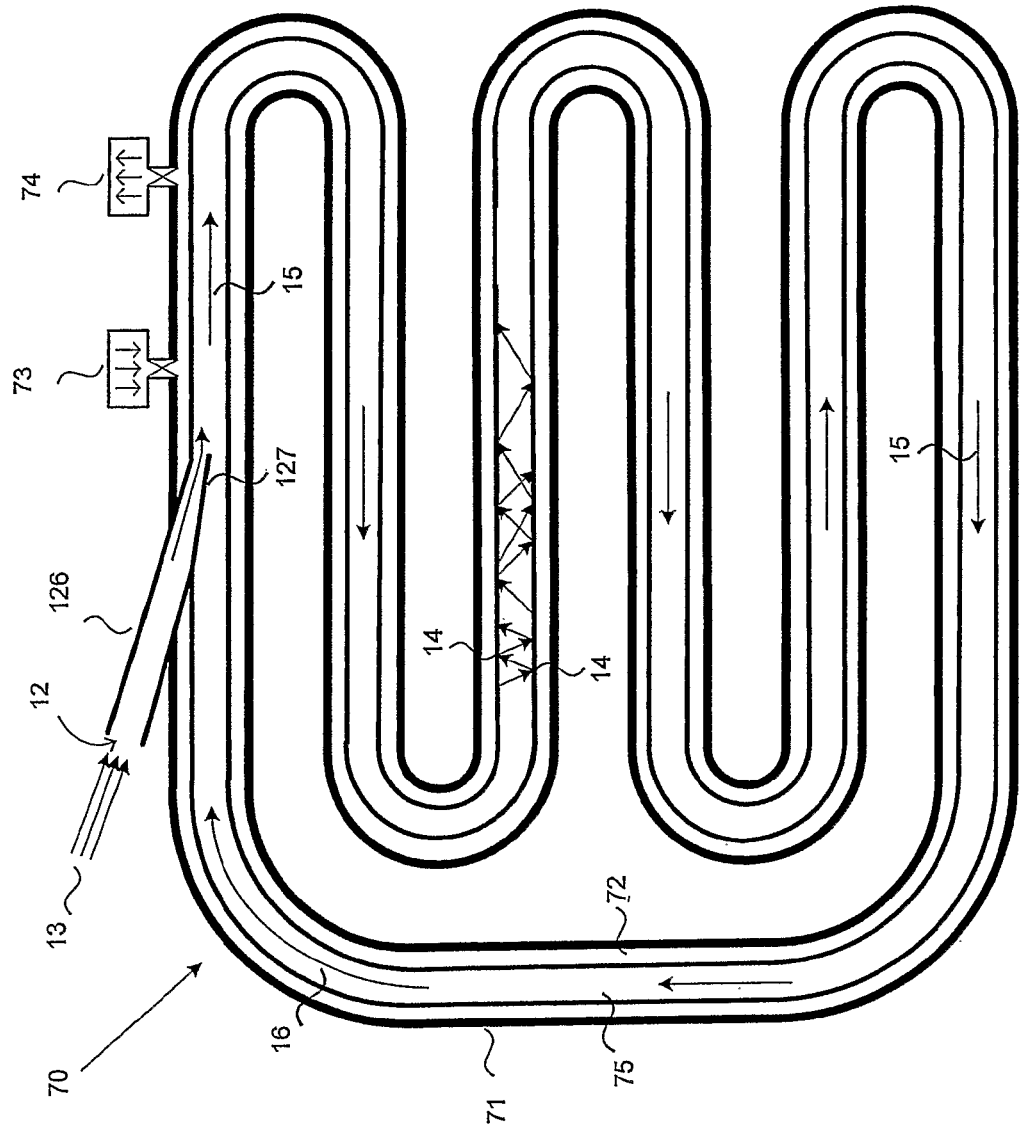
FIG. 7 is a schematic cross-sectional diagram of a second solar energy trap according to the invention.
Figure 8:
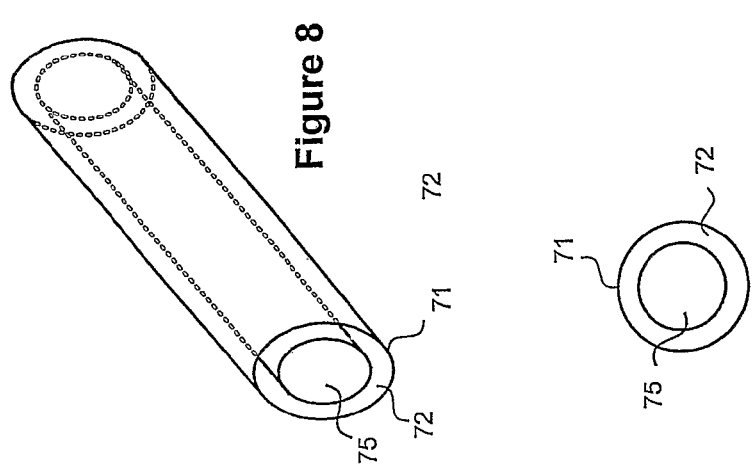
FIG. 8 is a perspective view of a tubular section of the solar energy trap of FIG. 7, having a circular transverse cross-section.
Figure 9:
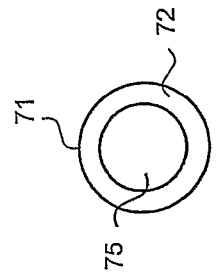
FIG. 9 is a transverse cross-sectional view of a tubular section of the solar energy trap of FIG. 7.

A second solar trap for use in the invention is illustrated in FIGS. 7 to 9. As best shown in FIG. 7, the second embodiment of a trap 70 is similar to the first embodiment, except that the closed chamber is double walled to form an external coaxial jacket. Liquid may be circulated in a space 72 between the chamber 75 and an outer wall 71 of the chamber to minimise temperature variations and prevent hotspots forming. A safety pressure relief valve, not shown, may be in communication with the circulating liquid. Cooling liquid may be introduced into the space 72 through an inlet valve 73 and heated liquid or vapour withdrawn through an outlet valve 74. Thus heat energy may be withdrawn from the solar energy trap. Moreover, or alternatively, the closed chamber may be enclosed in a pressurised vessel to generate high-grade steam. Such high-grade steam may be used to drive one or more electric generators.

Figure 10:
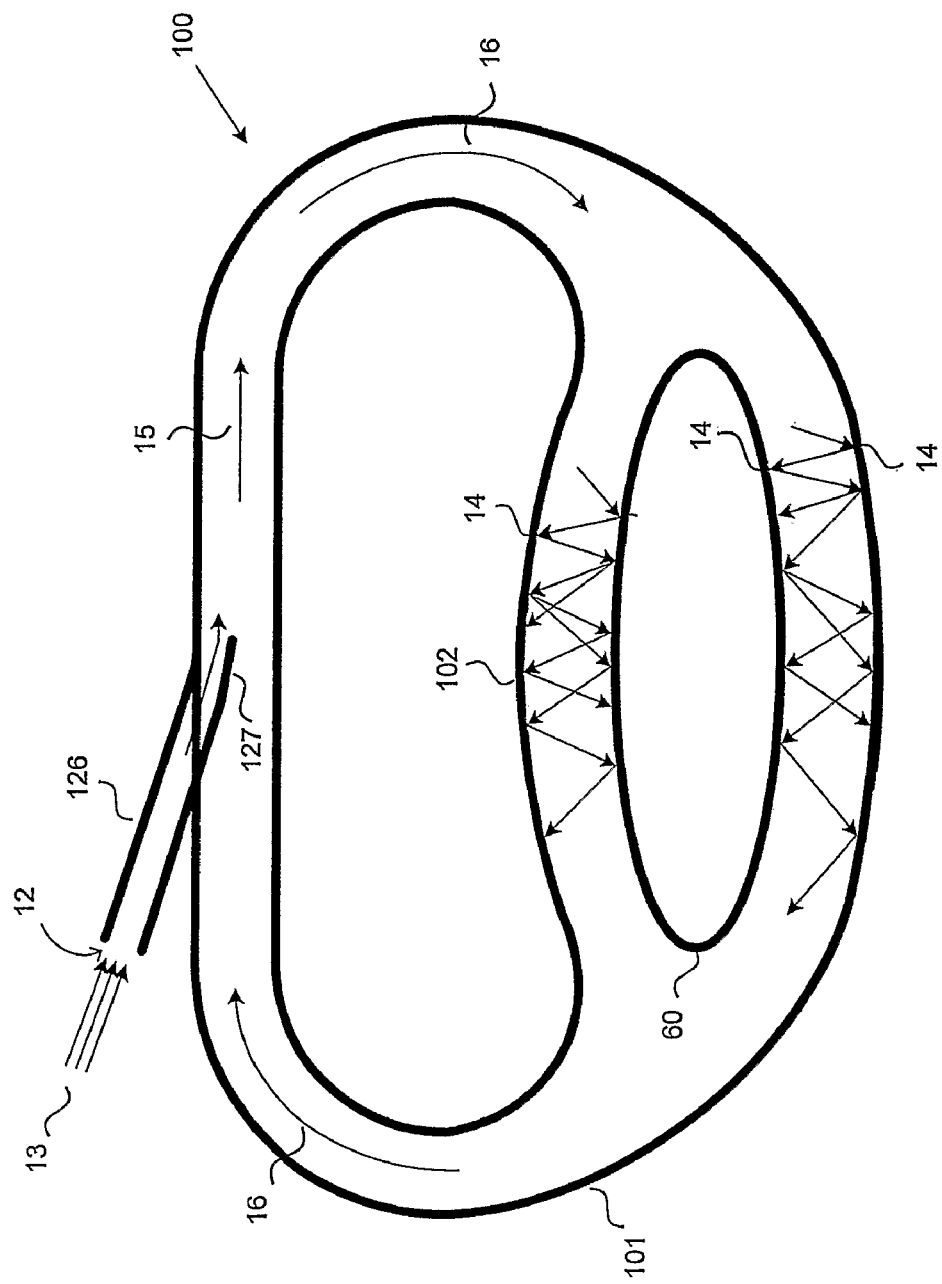
FIG. 10 is a schematic cross-sectional diagram of a third solar energy trap according to the invention.
Figure 11:
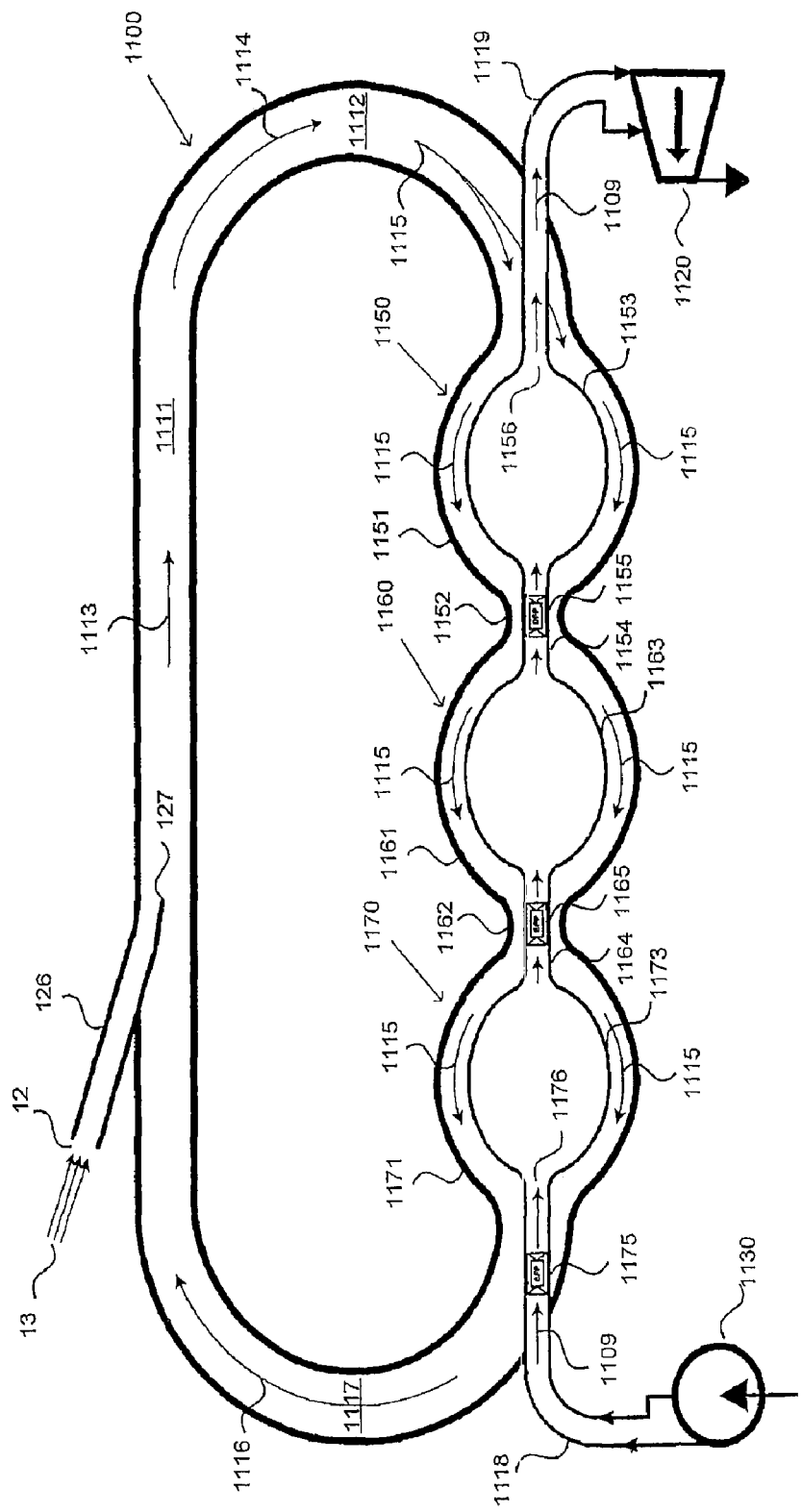
FIG. 11 is a schematic cross-section diagram of an embodiment of a solar energy turbine according to the invention.
Figure 12:
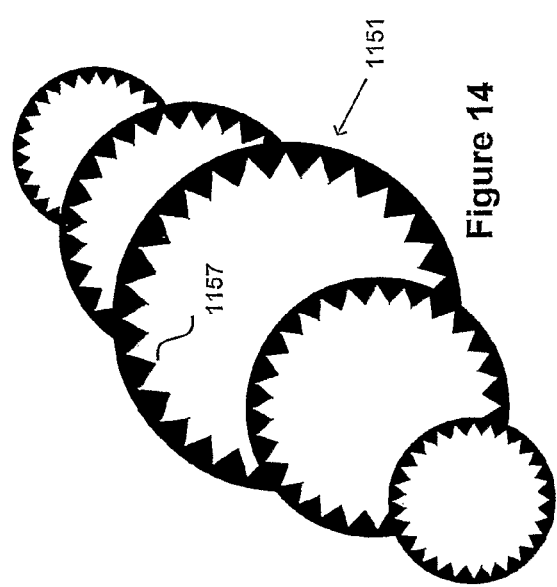
FIG. 12 is a schematic perspective view of an outer housing of a heat exchange chamber of the solar turbine of FIG. 11.

As shown in FIG. 10, a third solar trap 100 of the invention, having a generally annular chamber 101, with an enlarged transverse cross-section portion 102 enclosing an incineration vessel 60 for containing material to be heated, may be used for incineration, for example of harmful substances, or for cremation, to avoid the use of fossil fuels. A gas handling system, not shown, may provide an inert gas to be used inside the chamber to prevent oxidation from circulating air inside the chamber. During incineration above a threshold temperature, ionised plasma will be formed, from which it may be possible to extract direct current electricity. It will be understood that an incineration vessel may be included in other shapes of chamber, provided substantially all admitted solar energy is absorbed within the chamber.

The closed chamber may be constructed of, for example, metals, metal alloys, or ceramics or a combination of such materials. A working temperature of the solar energy trap will depend upon an application for which the solar energy trap is used. For incineration at high pressures, the chamber may be formed of titanium-tungsten with a high-temperature ceramics internal lining. In the embodiment shown in FIG. 10, the annular chamber 101 may be formed of titanium-tungsten with a high-temperature ceramic internal lining and the incineration vessel 60 formed from titanium-tungsten with a high-temperature ceramic external lining. The incineration vessel 60 is preferably provided with temperature and pressure controls, not shown.

Two small-scale examples of solar energy traps according to the invention have been built. In a first example with an air-cooled aluminium pipe chamber, the aluminium pipe melted. In a second example, in which the chamber was immersed in water, the temperature of the water was raised to boiling point.

In an embodiment of the invention illustrated in FIGS. 11 to 17 there is provided a solar energy trap 1100 and a solar turbine. The solar energy trap comprises a hollow chamber formed from an elongate tubular portion 1111 connected at opposed ends to respective first legs of first and second opposed U-shaped tubular portions 1112, 1117. Respective second legs of the first and second U-shaped portions are joined by a heat exchanger portion comprising first, second and third, substantially ellipsoid, outer housings 1151, 1161, 1171 of heat exchangers 1150, 1160, 1170 serially connected by first and second outer interconnecting tubes 1152, 1162, respectively. Located within each of the outer housings 1151, 1161, 1171 of the heat exchangers are respective substantially ellipsoid inner housings 1153, 1163, 1173 coaxial on major axes with the respective outer housings. The inner housings are serially connected by first and second inner interconnecting tubes 1154, 1164 coaxial with the first and second outer interconnecting tubes 1152, 1162 respectively. The first and second inner interconnecting tubes 1154, 1164 are provided with first and second back flow prevention valves 1155, 1165 respectively to prevent backflow from the first inner housing 1153 to the second inner housing 1163 and from the second inner housing 1163 to the third inner housing 1173, respectively. The inner housings 1153, 1163, 1173 are sufficiently spaced from the respective outer housings 1151, 1161, 1171 and the inner interconnecting tubes 1154, 1164 sufficiently spaced from the respective outer interconnecting tubes 1152, 1162 to allow passage of at least some photons from the first U-shaped portion 1112 to the second U-shaped portion 1117 around the inner housings 1153, 1163, 1173 within the respective outer housings 1151, 1161, 1171 and around the inner interconnecting tubes 1154, 1164 within the respective outer interconnecting tubes 1152, 1162.

An inlet port 12 formed by an inlet tube 126, of smaller cross-sectional diameter than portions of the chamber 1100, and passing through a tubular wall of the elongate portion 1111, has a longitudinal axis at a first acute included angle to a longitudinal axis of the elongate portion 1111. As in the first embodiment, a portion 127 of the inlet tube protruding into the elongate portion 1111 is inclined at a second acute included angle to a longitudinal axis of the elongate portion 1111 smaller than the first acute included angle.

An outlet port 1156 of the first inner housing 1153, upstream of the photon flow from the second and third inner housings 1163, 1173, is connected by a outlet tube 1119 to an inlet port of a turbine 1120. An inlet port 1176 of the third inner housing 1173 downstream of the photon flow from the first and second inner housings 1153, 1163, is connected by a input pipe 1118 to an outlet port of a compressor 1130. The input pipe 1118 is provided with a third back flow prevention valve 1175 to prevent flow from the third inner housing 1173 to the compressor 1130. Inner housing 1173 to the compressor 1130. An outlet port of the turbine 1120 is optionally connected by a first re-circulating pipe 1121 to an optional re-circulator 1140 and an outlet of the optional re-circulator 1140 is optionally connected by a second re-circulating pipe 1141 to an inlet port of the compressor 1130.

Figure 14:
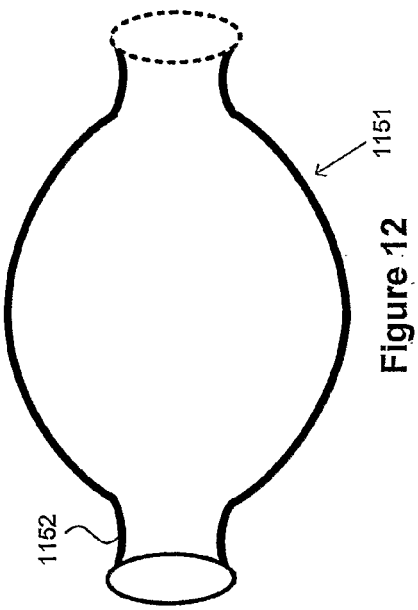
FIG. 14 shows transverse cross-sections of the outer housing of the heat exchange chamber of FIG. 12.
Figure 13:
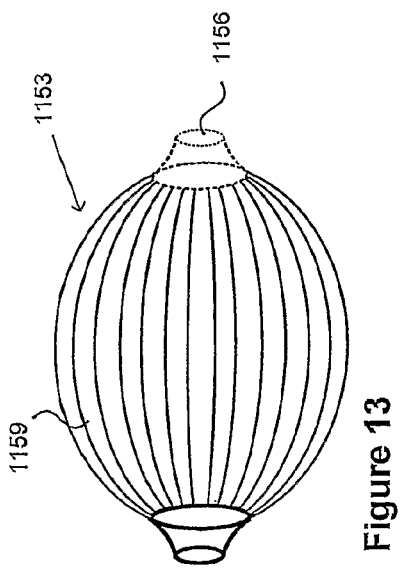
FIG. 13 is a schematic perspective view of an inner housing of the heat exchange chamber of FIG. 12.
Figure 15:
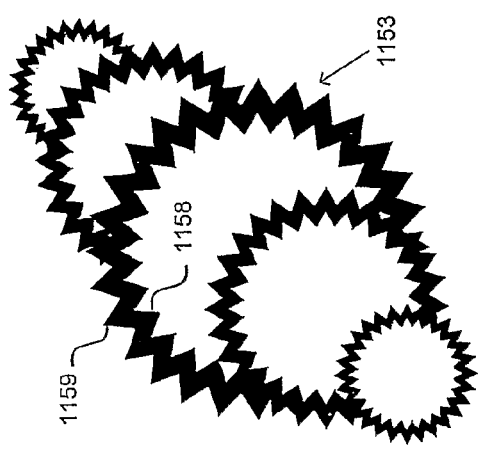
FIG. 15 show transverse cross-sections of the inner housing of the heat exchange chamber of FIG. 12.
Figure 16:
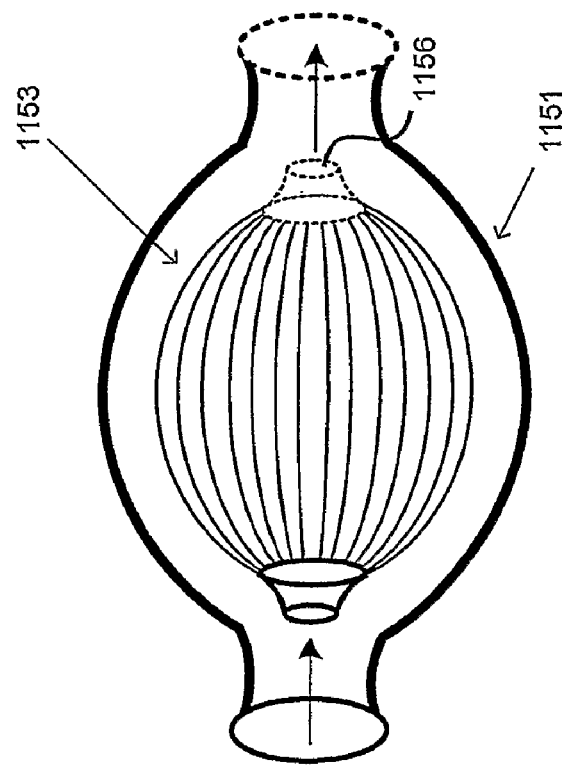
FIG. 16 is a schematic perspective view of the heat exchanger assembled from the outer housing of FIG. 12 and the inner housing of FIG. 13.
Figure 17:
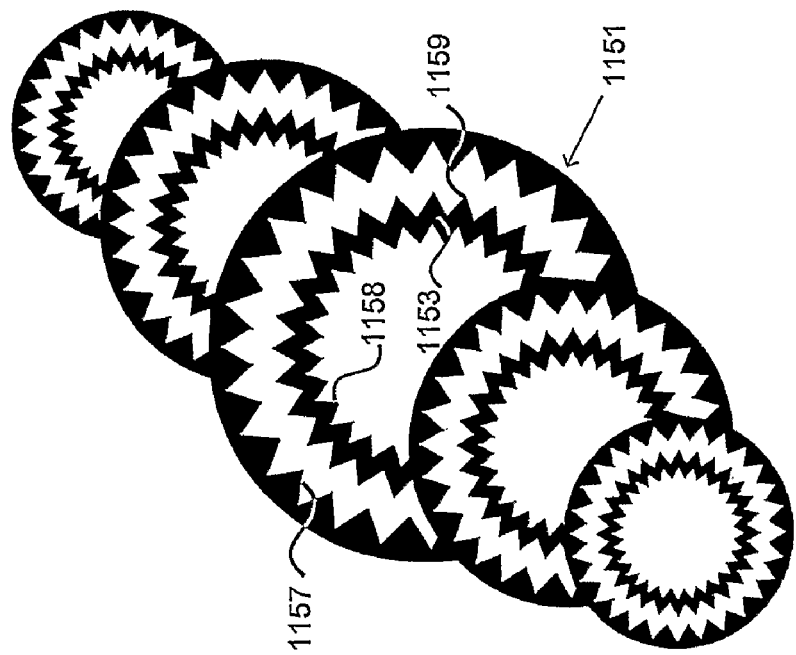
FIG. 17 shows transverse cross-sections of the heat exchanger of FIG. 16.

As best shown in FIGS. 14 and 17, an inner face of each of the outer housings 1151, 1161, 1171 is convoluted with longitudinal first convolutions 1157 to increase a surface area of each of the inner faces. Similarly, as best seen in FIGS. 15 and 17, inner and outer faces of each of the inner housings is convoluted respectively with longitudinal second and third convolutions 1158, 1159 to increase surface areas of inner and outer faces of each of the inner housings 1153, 1163, 1173.

In use, the inner housings 1153, 1163, 1173 and inner connecting tubes 1154, 1164 are filled with a fluid, which may be a gas or a liquid. As in previously described embodiments herein, light energy (13) enters the solar energy trap 1100 through the inlet port (12) and follows a circular path around the solar energy trap (1111, 1112, 1117) indicated with arrows (113, 1114, 1115, 1116).

That is, fluid enters the third inner housing 1173, through the third back flow prevention valve 1175, under pressure from compressor 1130 in a fluid direction shown by arrow headed lines 1109. The fluid passes in turn through the third inner housing 1173; the second inner interconnecting tube 1164, including the second back flow prevention valve 1165; the second inner housing 1163; the first inner interconnecting tube 1154, including the first back flow prevention valve 1155; and the first inner housing 1153 to exit through the outlet tube 1119 to the turbine 1120. Optionally fluid is output from the turbine 1120 to the re-circulator 1140 to enable use of liquids with short evaporation times and large expanding volumes.

At least some of the energy of photons circulating through the solar energy trap 1100 is absorbed by the second convolutions 1159 or corrugated outer surface of the inner housings 1153, 1163, 1173 and transmitted through the walls of the inner housings to be transferred by the third convolutions 1158 of the expanded surface area of the inner walls of the housings to the fluid within the inner housings.

The first convolutions 1157 or corrugated inner surface of the outer housings 1151, 1161, 1171 also enhance transfer of energy from photons in the solar energy trap to the wall of the outer housing, from which at least some of the absorbed energy is re-radiated towards the corresponding inner housing 1153, 1163, 1173 respectively.

The transfer of heat into the fluid causes the fluid at least to expand, and possibly to evaporate, and thus drive the turbine. Backflow of the heated, or evaporated, fluid is prevented by the back flow prevention valves 1155, 1165, 1175.

Suitable fluids for use in the inner housings 1153, 1163, 1173 to drive the turbine 1120 are air or water.

Although an embodiment of the invention has been illustrated with three heat exchangers 1150, 1160, 1170 in series, it will be understood that fewer or more heat exchangers may be used, either in series or in parallel.

Preferably, inner and/or outer surfaces of the solar energy trap 1100, other than inner surfaces in the heat exchanges, are thermally insulated so that most of the energy of the photons is absorbed by the inner housings 1153, 1163, 1173 and not dissipated out of the solar energy trap through tubing walls of the trap.

Although only a single turbine 1120 has been illustrated, it will be understood that more than one turbine may be connected in parallel or in series. Conveniently, the turbine is, or turbines are, used to drive one or more electricity generators, not shown.

Figure 18:
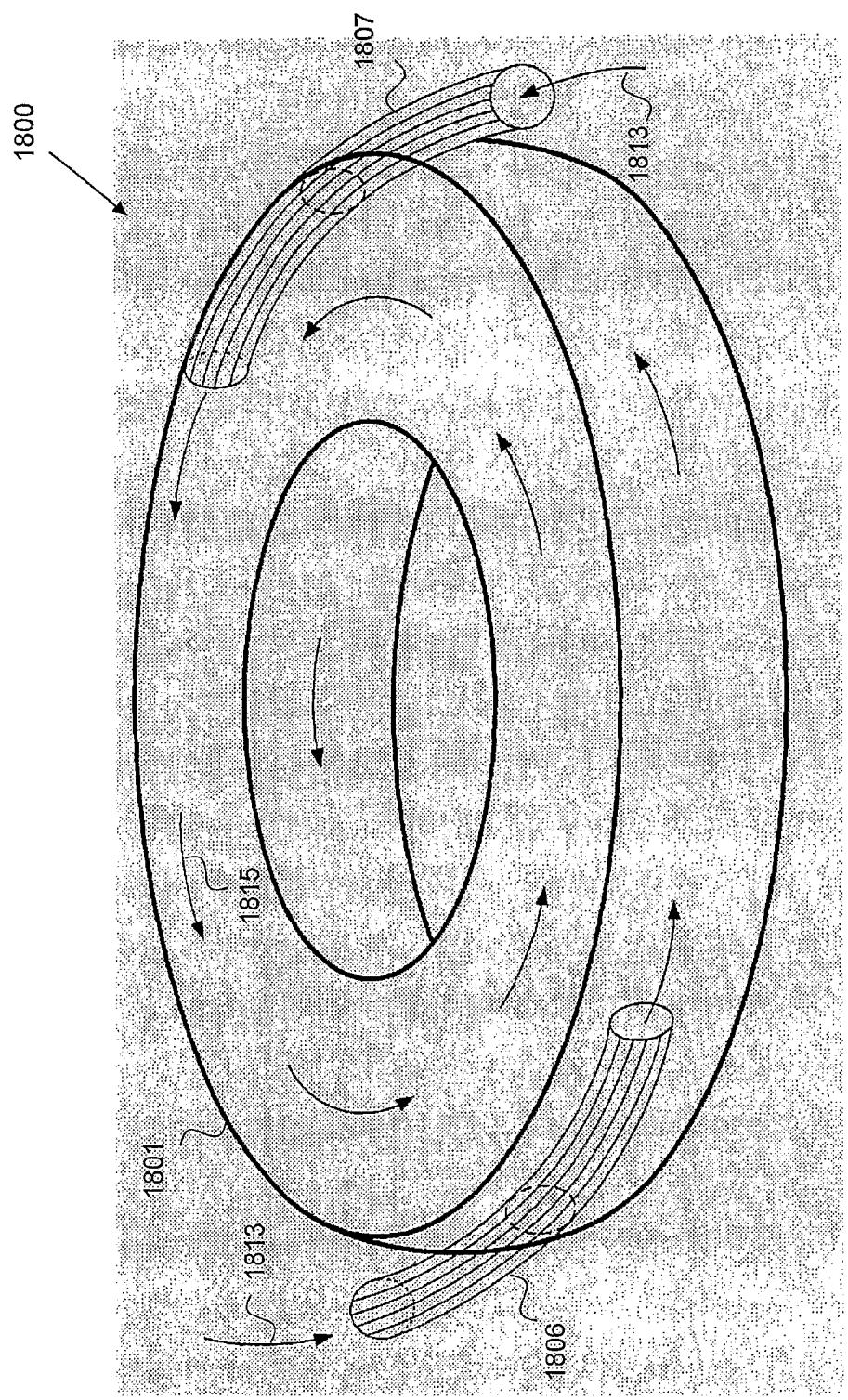
FIG. 18 is a perspective view of a fifth solar energy trap according to the invention.

Referring to FIG. 18, a fifth solar trap of the invention comprises a annular solar energy trap 1800 comprising an annular chamber 1801, similar in form to a cyclotron, having first and second opposed arcuate entry tubes 1806, 1807, although additional entry tubes could also be used, passing into the chamber at two diametrically opposed locations on an outer wall of the annular chamber. The entry tubes 1806, 1807 enter the chamber substantially tangentially to the chamber in a same anticlockwise sense.

Solar energy 1813, collected in any known manner, and entering the tube is reflected along the tube to enter the annular chamber substantially tangentially and to be reflected around the chamber, as indicated by arrow-headed line 1815, by multiple reflections from an inner wall of the annular chamber, until absorbed and dissipated by an external surface of the device, which acts as a heat exchanger.

The invention claimed is:

1. A solar energy turbine comprising:
a solar energy trap chamber defining an internal volume, the chamber having an inlet port for communicating with the internal volume, such that solar energy entering the chamber through the inlet port is absorbed and reflected within the chamber until substantially all the solar energy is absorbed by the chamber;
a heat exchanger; and
a turbine in fluid communication with the heat exchanger, the heat exchanger extracting heat energy from the chamber and the turbine such that energy of photons in the solar energy trap is absorbed by a fluid contained within the heat exchanger to drive the turbine,
wherein the inlet port is adapted to cause photons of the solar energy entering the chamber to circulate substantially in a single direction within the chamber until absorbed, such that on re-passing the inlet port substantially no photons emerge from the inlet port.

2. A solar energy turbine as claimed in claim 1, further comprising a photovoltaic cell located on an internal wall of the chamber, the photovoltaic cell adapted to convert at least some of the solar energy to electricity.

3. A solar energy turbine as claimed in claim 1, further comprising a thermovoltaic cell located on an internal wall of the chamber, the thermovoltaic cell adapted to convert at least some of the solar energy to electricity.

4. A solar energy turbine as claimed in claim 2, further comprising a temperature control unit for maintaining a predetermined temperature differential across a member selected from the group consisting essentially of the photovoltaic cell and the thermovoltaic cell for obtaining substantially maximum working efficiency thereof.

5. A solar energy turbine as claimed in claim 1, wherein the heat exchanger includes a jacket located around a portion of the chamber.

6. A solar energy turbine as claimed in claim 1, wherein the chamber is enclosed in a pressurized vessel for generation of high-grade steam.

7. A solar energy turbine as claimed in claim 6, further comprising an electric generator for using the high-grade steam to generate electricity.

8. A solar energy turbine as claimed in claim 1, wherein the chamber has a shape of a re-circulating serpentine.

9. A solar energy turbine as claimed in claim 8, wherein the chamber comprises a plurality of elongate portions joined serially at alternate ends to neighboring elongate portions by semicircular portions, a first of the plurality of elongate portions being joined to a serially last of the elongate portions by a U-shaped portion, to form a re-circulating chamber.

10. A solar energy turbine as claimed in claim 1, wherein the chamber is a re-circulating coil.

11. A solar energy turbine, as claimed in claim 1, wherein the chamber includes an annulus.

12. A solar energy turbine as claimed in claim 1, wherein the inlet port includes an inlet tube communicating with the internal volume.

13. A solar energy turbine as claimed in claim 12, wherein a longitudinal axis of the inlet tube is inclined at an acute internal angle relative to a longitudinal axis of an elongate portion of the chamber.

14. A solar energy turbine as claimed in claim 1, wherein the chamber has a circular transverse cross-section.

15. A solar energy turbine as claimed in claim 1, wherein the chamber has a polygonal transverse cross-section.

16. A solar energy turbine as claimed in claim 15, wherein the chamber has a cross-section selected from the group consisting essentially of a square, an octagonal and a triangular cross-section.

17. A solar energy turbine as claimed in claim 1, wherein the chamber includes a hinged panel that forms a wall of the chamber on which one of photovoltaic cells and thermovoltaic cells are located to form an inner surface of the chamber.

18. A solar energy turbine as claimed in claim 1, adapted for incineration of waste material.

19. A solar energy turbine as claimed in claim 1, adapted for cremation of bodies.

20. A solar energy turbine as claimed in claim 18, further comprising an incineration vessel located within the chamber for containing material or a body to be incinerated.

21. A solar energy turbine as claimed in claim 20, wherein the incineration vessel includes a member selected from the group consisting essentially of a temperature control unit and a pressure control unit.

22. A solar energy turbine as claimed in claim 1, wherein the chamber is constructed of at least one material selected from the group consisting essentially of metal, metal alloy and ceramic.

23. A solar energy turbine as claimed in claim 1, wherein the chamber is constructed of titanium-tungsten internally lined with high-temperature ceramic material.

24. A solar energy turbine as claimed in claim 1, comprising a gas handling unit for providing an inert gas environment within the chamber.

25. A solar energy turbine as claimed in claim 1, wherein the heat exchanger includes at least one inner housing for containing the fluid and an outer housing spaced from the inner housing to allow passage therebetween of photons in the solar energy trap.

26. A solar energy turbine as claimed in claim 1, wherein a first face of the heat exchanger within the solar energy trap is provided with one of convolutions and corrugations to increase a surface area of the first face to thereby enhance absorption of energy from photons within the solar energy trap.

27. A solar energy turbine as claimed in claim 1, wherein a second face of the heat exchanger in contact with the fluid is provided with one of convolutions and corrugations for enhancing absorption of energy from the second face by the fluid.

28. A solar energy turbine as claimed in claim 1, further comprising a one-way valve adapted to substantially prevent flow of the fluid away from an inlet port of the turbine.

29. A solar energy turbine as claimed in claim 1, further comprising a compressor for injecting the fluid into the heat exchanger.

30. A solar energy turbine as claimed in claim 1, comprising in fluid communication:
a compressor,
a first inner housing of a first heat exchanger,
a second inner housing of a second heat exchanger,
a third inner housing of a third heat exchanger; and
said turbine.

31. A method of converting solar energy comprising the steps of:
a. providing a chamber defining an internal re-circulating volume;
b. providing an inlet port communicating with the internal volume;
c. admitting solar energy through the inlet port into the internal volume such that the solar energy is repeatedly reflected within the chamber until substantially all the solar energy is absorbed by the chamber such that photons of the solar energy entering the chamber are caused to circulate substantially in a single direction within the chamber until absorbed, such that on re-passing the inlet port substantially no photons emerge from the inlet port; and
d. providing a heat exchanger in thermal communication with the chamber and a turbine in fluid communication with the heat exchanger, such that energy of the photons in the solar energy trap is absorbed by a fluid contained within the heat exchanger to drive the turbine.

32. A method as claimed in claim 31, further comprising a step of providing a photovoltaic cell on internal walls of the chamber and converting at least some of the solar energy to electricity with the photovoltaic cell.

33. A method as claimed in claim 31, further comprising a step of providing a thermovoltaic cell on internal walls of the chamber and converting at least some of the solar energy to electricity with the thermovoltaic cell.

34. A method as claimed in claim 32, further comprising a step of providing a temperature control unit and maintaining a predetermined temperature differential across one of the photovoltaic cell unit and the thermovoltaic cell means for substantially maximum working efficiency thereof.

35. A method as claimed in claim 31, wherein the step of providing a heat exchanger includes providing a jacket located around at least a portion of the chamber.

36. A method as claimed in claim 31, further comprising a step of providing a pressurized vessel that encloses the chamber and a step of generating high-grade steam within the pressurized vessel.

37. A method as claimed in claim 36, further comprising a step of providing an electric generator and a step of using the high-grade steam for generating electricity.

38. A method as claimed in claim 31, further comprising a step of incinerating waste material with the trapped solar energy.

39. A method as claimed in claim 31, further comprising a step of cremating bodies with the trapped solar energy.

40. A method as claimed in claim 31, further comprising a step of providing an incineration vessel within the chamber for containing material or bodies to be incinerated.

41. A method as claimed in claim 31, further comprising a step of providing a gas handling unit and producing an inert gas environment within the chamber with the gas handling unit.

42. A method as claimed in claim 31, wherein the step of providing a heat exchanger includes providing an inner housing for containing the fluid and an outer housing spaced from the inner housing and allowing passage therebetween of photons in the solar energy trap.

43. A method as claimed in claim 31, further comprising a step of providing a first face of the heat exchanger within the solar energy trap with convolutions or corrugations to increase a surface area thereof, and to enhance absorption of energy by the first face from photons within the solar energy trap.

44. A method as claimed in claim 31, further comprising a step of providing a second face of the heat exchanger in contact with the fluid with convolutions or corrugations to enhance absorption of energy from the second face by the fluid.

45. A method as claimed in claim 31, further comprising a step of providing a one-way valve and substantially preventing flow of the fluid away from an inlet port of the turbine with the one-way valve.

46. A method as claimed in claim 31, further comprising a step of providing a compressor and injecting the fluid into the heat exchanger with the compressor.

47. A method as claimed in claim 31, further comprising:
providing, in fluid communication:
a compressor,
a first inner housing of a first heat exchanger,
a second inner housing of a second heat exchanger,
a third inner housing of a third heat exchanger; and
said turbine; and
passing the fluid from the compressor through the first inner housing, the second inner housing and the third inner housing, the fluid absorbing energy from photons in the solar energy trap to increase the energy of the fluid, the fluid being passed to the turbine; and
driving the turbine with the increased energy fluid.

* * * * *